Sept. 8, 1931.  R. E. SLAYTON  1,822,243
FOWL PLUCKING MACHINE
Filed Jan. 21, 1929  3 Sheets-Sheet 1
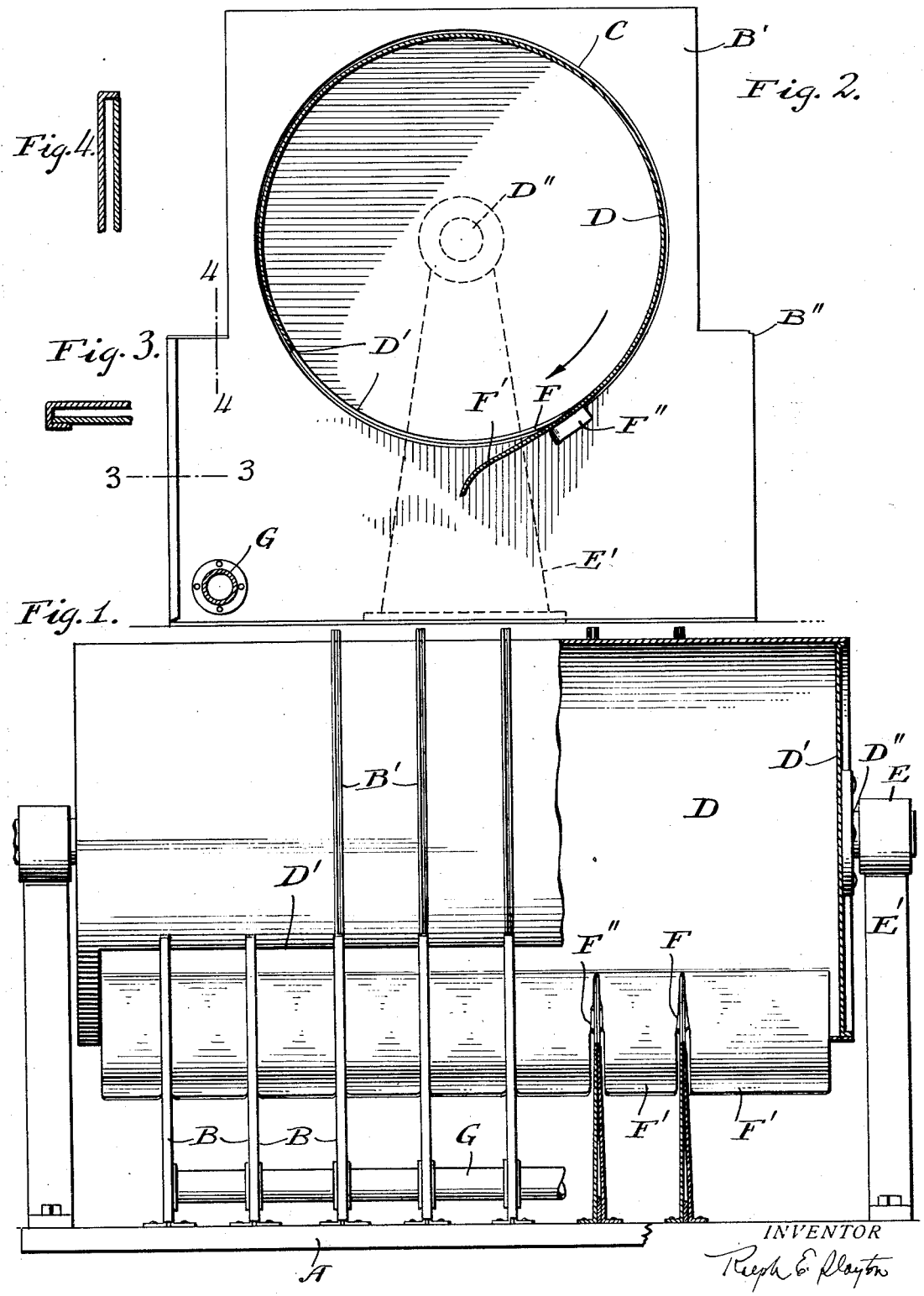

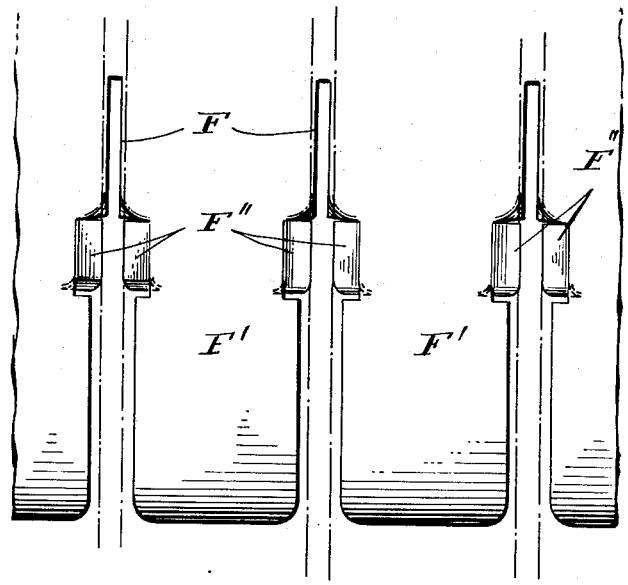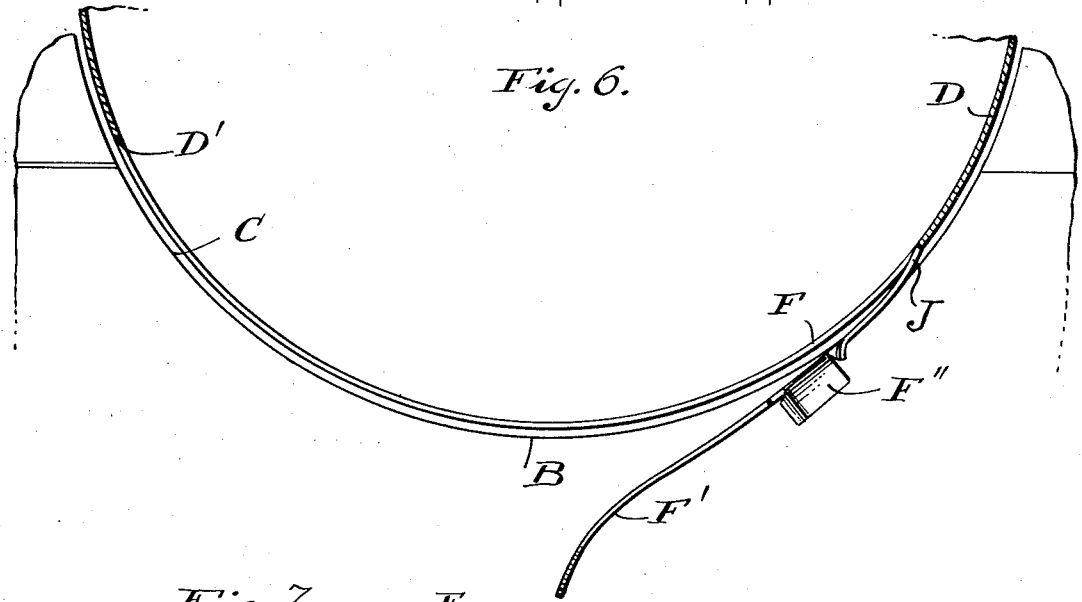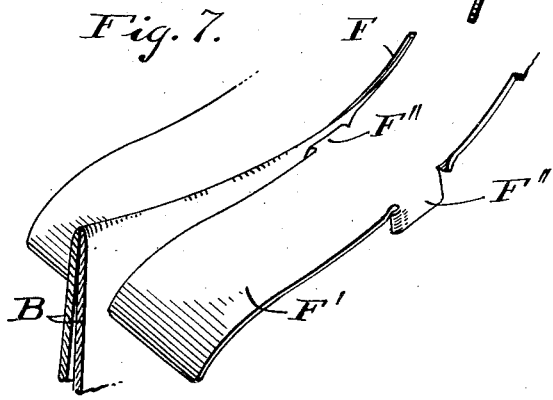

Sept. 8, 1931.  R. E. SLAYTON  1,822,243
FOWL PLUCKING MACHINE
Filed Jan. 21, 1929  3 Sheets-Sheet 3
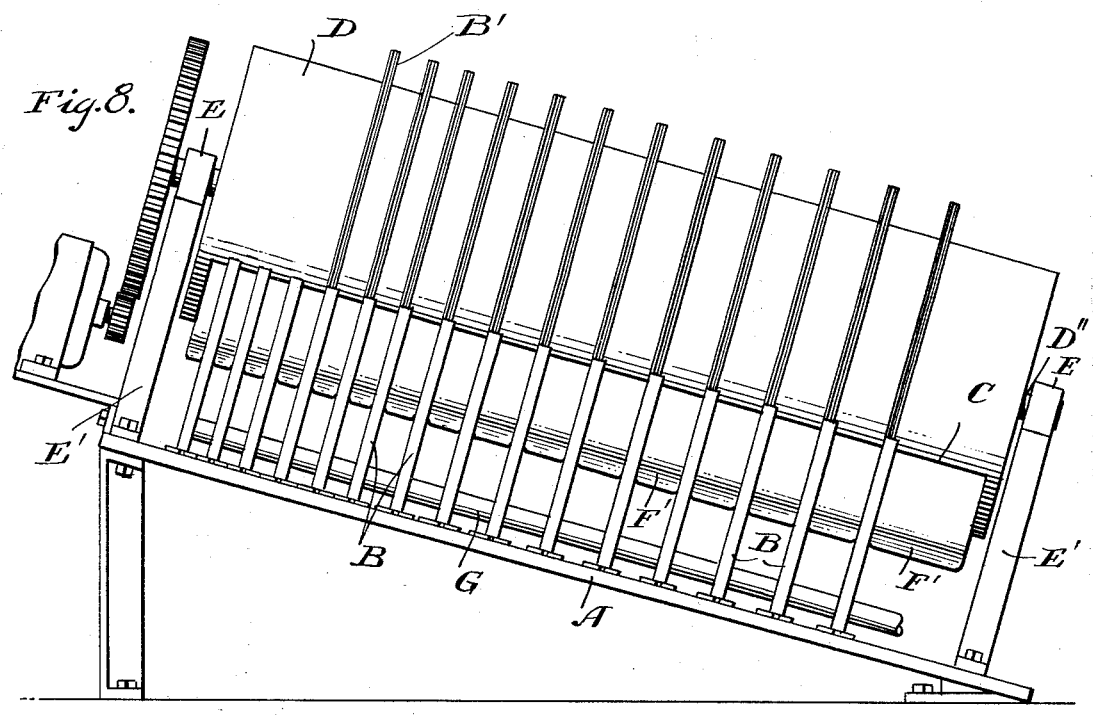
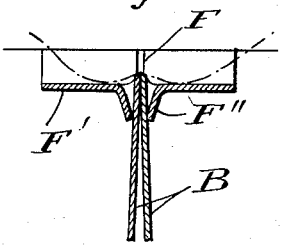 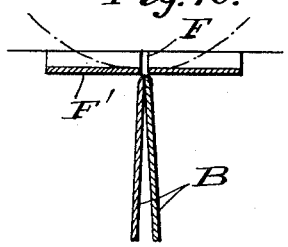 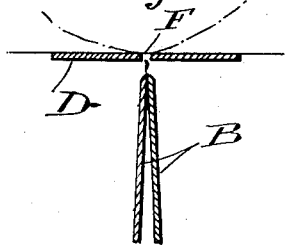
INVENTOR
Ralph E. Slayton Patented Sept. 8, 1931

1,822,243

UNITED STATES PATENT OFFICE

RALPH E. SLAYTON, OF BROOKLYN, NEW YORK

FOWL PLUCKING MACHINE

Application filed January 21, 1929. Serial No. 333,919.

This invention relates to a method of and apparatus for removing the feathers from fowl and has more special reference to a machine for effecting the removal of such feathers in a substantially automatic manner.

The object of the invention is to provide an automatic device which will minimize the possibility of tearing the skin and which will remove the feathers from substantially all parts of the object to be plucked.

One aspect of the invention resides in gripping the feathers and maintaining the gripped portions of the feathers in a substantially constant position and then progressively lifting the body of the fowl from the gripped feathers so that but few feathers are detached at a time. More specifically stated this aspect of the invention resides in gripping a line of feathers and then wedging the body of the fowl away from the gripped feathers commencing near one end of the line of gripped feathers and advancing along the line so that the tearing of the skin is prevented.

The illustrated embodiment of the invention (comprehensively stated) comprises a plurality of elevated plucking stations on which the object is adapted to be suspended, spaced apart from each other (preferably at different distances so that unsuspended portions of the fowl will sink to different positions between them) thereby enabling the gripping jaws on which the object is suspended to come into contact with different portions of the body of the fowl. The plucking jaws are arranged in cascade fashion from the horizontal so that the object may be fed from one station to the next by gravity.

In the German patent (German Patent No. 382,246, dated Nov. 16, 1922), there is shown a non-automatic device comprising flexible jaws which are pressed together to grip the feathers. In the U. S. patent to MacPherson No. 1,231,401, there is shown an object supporting cradle which permits the object to partly protrude through it, with a plucking jaw having a suction nozzle rising to different positions to pluck the feathers. In the present invention the object sinks to rest on stationary jaws thereby obviating any necessity for a vertical movement of the jaws and simplifying the device considerably. In the U. S. patent to Ferris No. 765,233, there are shown a pair of husking rolls inclined at an angle to the horizontal for feeding the object by gravity but the rolls do not cooperate with gripping jaws and would be entirely useless for removing feathers from fowl.

In the drawings, one embodiment of the invention is illustrated for the purposes of affording a clear understanding of the underlying principles of the invention to those skilled in the art but without limiting the invention to the specific details shown therein.

In said drawings, Fig. 1 is a side elevation of the invention partly fragmentary and partly in section;

Fig. 2 is a vertical section of Fig. 1;

Fig. 3 is a section of Fig. 2 on the line 3—3;

Fig. 4 is a section of Fig. 2 on the line 4—4;

Fig. 5 is a fragmentary front detail view of the arms for gathering the object and the means for closing the plucking jaws;

Fig. 6 is an enlarged side detail view similar to Fig. 5 and partly in section;

Fig. 7 is a perspective view of the object gathering arms and jaws closing means shown in Fig. 5;

Fig. 8 is a side elevation partly fragmentary of the invention showing the driving mechanism and the manner in which the device is tilted from the horizontal;

Fig. 9 is a section of the drum and jaws taken in the region of the plucking jaws in one position of the main cylinder;

Fig. 10 is a section showing the main cylinder rotated slightly from the position shown in Fig. 9; and Fig. 11 shows the cylinder as still further rotated from the positions in Figs. 9 and 10.

Continuing now by way of a more detailed description, a base A (as shown more particularly in Fig. 1) and inclined, (as shown in Fig. 8) has arranged thereon a plurality of elevated plucking stations B, each plucking station consisting of a pair of parallel slightly spaced upstanding flexible metal (preferably sheet metal) plates as shown in Figs. 1 and 2. These sheet metal plates have their outer spaced edges closed in any convenient manner, to localize the air draft created in the space between the plates forming a station as, for example, by providing overlapping flanges as B'. Obviously however a thin strip of metal having one edge attached to one member and overlying the other might be used, or the entire side and top of the plucking stations might be walled in, the plates of the plucking station abutting against the walls but having a free sliding movement relatively to such side and top walls as will be readily understood. A preferably circular opening C is cut in each of the plates B considerably above the base, the openings of the plates being axially aligned to receive a rotatable drum D having a longitudinal opening for depositing the fowl on the lower portion of the circular cut away part or plucking jaw of the plate B, the object spilling over the edge D' when the drum is rotated. The drum D is conveniently closed at each end by preferably cylindrical disks D'' which serve to maintain the shape of the drum, and afford means for connecting the drum journals or shafts D''', which are carried in convenient journal bearings E supported on brackets E'. The drum is rotated by suitable driving mechanism connected to shafts D''. The drum D has a plurality of narrow slotted openings F which extend from the longitudinal edge of the drum opening opposite the spill opening D' at right angles to the axis of the drum, each opening being aligned with one of the plucking stations and affording a plurality of object gathering tongues or fingers F' which are bent down as shown in Fig. 2 so as to project beyond the periphery of the drum and straddle stations B (as shown in Fig. 7). On each side of the tongues F' opposed jaw clamping elements or presser feet F'' are preferably cut from the sheet metal forming the tongue or drum and are bent down as shown in Fig. 7 to afford a wiping contact against the vertical plate or jaw B; although obviously not essential. For example, spring pressed shoes carried by the drum bearing against each side of the plucking jaw B might be used (as is apparent from an inspection of Fig. 7) or instead of forming the presser feet from the sheet metal forming the cylinder, separate spring metal strips might be mounted on the back of the fingers F' to wipe the upstanding gripping plates, and in order to minimize friction, ball or roller bearings might be used. It will be observed that as the presser feet bear on the vertical plates forming a plucking station the plates are pressed together. In order to create on air draft between the upstanding gripping plates or jaws B to suck the feathers between them so that they may be clamped when the jaws close, a pipe line (consisting of flanged pipe segments G connected to the adjacent sides of each plucking station) communicates with the space between each pair of plates forming a plucking station and is connected to a suitable draft creating device (preferably an exhaust blower) (not shown) as will be readily understood.

To operate the device, the object is placed in the drum D through the opening D' when the latter is near the top of the device. The object may be introduced into this opening since the extension parts B' of the jaws are cut away at the left of Fig. 8, although the drum might of course be extended beyond the stations in a manner similar to that shown at the right as in Fig. 8. As the rotation of the drum is continued in the direction of arrow Fig. 2, the fowl spilling edge D' of the drum opening is brought around toward its lowermost position or to a position above the arcuate jaws of the plucking stations as shown in Fig. 2. The object will spill over the edge D' and will be deposited directly on the lower or effective plucking portion or jaw C' of the circular cut away portion C of the plucking stations B. Because the stations and the arcuate jaws formed therein are elevated from the base and spaced from each other, the object will partly rest on the arcuate jaws C' and partly sink between them, depending on the station spacing, thereby bringing the elevated arcuate jaws against different portions of the object. The object will not ordinarily drop down to the base, because the maximum spacing of the station is generally less than the width of the object. It is not absolutely essential however that the maximum spacing be less than the width of the fowl since it would be a simple expedient to provide a platform between the plucking stations and within range of the sweep of fingers F' on which the object might fall to be subsequently recovered by these fingers. When the object is started, it rests on two or three of the plucking stations at the left of the device when viewed as in Fig. 8. Since these stations are comparatively close together, the object will not sink down very far and will rest on two or three stations depending on its size. As a draft is created through pipe segments G and in the spaces between each pair of plates the feathers will be sucked between the plates. As the cylinder is rotated, the downwardly bent arms F' will sweep below the object and the opposed jaw clamping members F" will slide along opposite sides of plates forming the station and close the jaws B and clamp the feathers sucked between them. As the drum continues its rotation; as shown in Figs. 2 and 6, the object resting on the top of the jaws B will be carried up the inclined cam J until it is again within the cylinder D. This movement of the object up the cam face J progressively lifts it from the jaws which are clamping a line of feathers and thus progressively separates the feathers from the object. The slots between the fingers F' taper to a comparatively narrow opening which commences near the cam face J so that the skin is supported on each side of the line of clamped feathers. This feature is an added precaution to prevent tearing the skin in addition to the feature already mentioned (i. e. removing but a few feathers at a time). As the cylinder D is moved around with respect to the object the spill edge D' again arrives near its lowermost position and deposits the object on another set of jaws B in a different position, the movement from one set of jaws to the next being effected because of the inclination of the drum from the horizontal and a consequent sliding movement of the object from the upper end of the drum toward the lower end while the object is in the drum proper. While the inclination of the drum as shown in Fig. 8 is indicated as approximately at 15° from the horizontal it is evident that other inclinations might be used depending largely on the length of the drum and the number of plucking stations. In a short drum it is desirable to have but small inclination from the horizontal so that the object will work very slowly from one end of the drum to the other. As the object is moved toward the right as in Fig. 8 the spacing of the plucking jaws becomes greater and the points of suspension of the fowl are more widely spaced enabling the fowl to sink deeper between the stations; or conversely stated enabling the jaws to reach up higher on the object. As the object moves from the narrower to the more widely spaced plucking stations different parts of the body of the object are reached by the jaws and because of the elevation of these jaws, the object will at sometime straddle the jaw, that is, one leg will hang over one side and the other over the other side, at sometime the wing and body will straddle the jaw and eventually a substantially complete removal of the feathers will be effected. The object drops out of the drum when it reaches the right hand end of the drum and the spill edge is near its lowermost position.

The position of the presser feet as shown in Fig. 6 is dependent on the use of rather rigid metal for the upstanding plates with rather light gauge material it is desirable to press the plates together at a point four or five inches ahead of the lifting action of cam J and this can be most easily accomplished by applying shoes to the presser feet.

This invention is related to the invention disclosed in my previously filed application under Serial Number 283,260.

It is claimed:

1. A device for removing feathers from fowl, combining a plurality of plucking stations, and means inclined to the horizontal for moving the object from station to station.

2. A device for removing feathers from fowl, combining a pair of gripping jaws on which the object is adapted to rest and a movable inclined surface moving between the object and on each side of the gripping jaws to lift the body of the fowl from the jaws.

3. A device for removing feathers from fowl, combining gripping jaws adapted to clamp a line of feathers and a cam surface adapted to move along one side of the line of clamped feathers to lift the body of the fowl and to separate the feathers therefrom.

4. A device for removing feathers from fowl, combining spaced elevated gripping jaws, the jaws being successively arranged in cascade from the horizontal and means comprising a rotating drum for lifting the object to be plucked from the jaws and shifting the object to different jaws.

5. A plucking station for devices for removing the feathers from fowl comprising flexible sheets having arcuate jaw members on which the object to be plucked is adapted to rest.

6. A device for removing feathers from fowl, combining a plurality of elevated plucking jaws, a rotatable fowl receiving drum inclined from the horizontal, having a fowl depositing opening, the drum being adapted to intermittently deposit the fowl in different sets of plucking jaws when the drum opening comes to its lowermost position, means moving with the drum to close the jaws, grip the feathers and means carried by the drum to lift the fowl from the jaws and to return it to a position within the drum.

7. Gripping means for fowl plucking machines comprising a pair of spaced parallel plates having an arcuate interior cut away and means to press the plates together.

8. A device for removing feathers from fowl combining a rotatable drum adapted to receive the object within it, and having a spill opening, and a plurality of plucking stations located below the drum so that when the drum is turned, the object will spill from the opening to a position on the plucking station, each plucking station consisting of a pair of plates and means to intermittently close the plates to grip the feathers.

9. A device for removing feathers from fowl combining a pair of movable feather gripping plates to hold a line of feathers, means moving in a direction parallel to the line of feathers to wedge the fowl away from the plates, and means to close the plates during the wedging operation.

10. A device for removing feathers from fowl combining a pair of movable plates having feather gripping edges to hold a line of feathers, inclined wedging members straddling the plates when the latter are closed, the end portion of the wedging members extending from below the gripping edges of the plates to a position above said edges, means to move the inclined wedging members lengthwise of said plates whereby the fowl resting on said edges is raised progressively from said edges, and means to close the plates during the wedging operation.

In testimony, whereof, I have signed my name to this specification this 19 day of January, 1929.

RALPH E. SLAYTON.